United States Patent
Pressley et al.

(10) Patent No.: US 12,327,497 B2
(45) Date of Patent: Jun. 10, 2025

(54) REMOTE CONTROL AND COMMUNICATION ADVERTISING DISPLAY SYSTEM AND METHOD

(71) Applicants: Gary Pressley, New Orleans, LA (US); Stacey Steffes, Landisville, PA (US)

(72) Inventors: Gary Pressley, New Orleans, LA (US); Stacey Steffes, Landisville, PA (US)

(*) Notice: Subject to any disclaimer, the term of this patent is extended or adjusted under 35 U.S.C. 154(b) by 239 days.

(21) Appl. No.: 18/140,466

(22) Filed: Apr. 27, 2023

(65) Prior Publication Data
US 2024/0363039 A1 Oct. 31, 2024

(51) Int. Cl.
*G09F 21/04* (2006.01)
*G09F 13/04* (2006.01)
*H04W 4/80* (2018.01)

(52) U.S. Cl.
CPC .......... *G09F 21/048* (2013.01); *G09F 13/044* (2021.05); *G09F 13/0463* (2021.05); *H04W 4/80* (2018.02)

(58) Field of Classification Search
CPC .. G09F 21/048; G09F 13/0463; G09F 13/044; H04W 4/80
See application file for complete search history.

(56) References Cited

U.S. PATENT DOCUMENTS

| | | | |
|---|---|---|---|
| 6,694,896 B1 * | 2/2004 | Milazzo | A47B 1/04 108/115 |
| 9,302,617 B2 | 4/2016 | Simmons | |
| 10,636,335 B2 | 4/2020 | Kis-Benedek Pinero et al. | |
| 2008/0078097 A1 * | 4/2008 | Lopez | F26B 21/001 40/606.03 |
| 2011/0239506 A1 * | 10/2011 | Glass, Jr. | G09F 15/0062 40/606.01 |
| 2016/0140886 A1 * | 5/2016 | Green, Jr. | G08B 5/38 40/581 |

(Continued)

FOREIGN PATENT DOCUMENTS

| | | |
|---|---|---|
| GB | 2387472 A | 10/2003 |
| KR | 200352298 Y1 | 6/2004 |

(Continued)

*Primary Examiner* — Gary C Hoge
(74) *Attorney, Agent, or Firm* — KEATY LAW FIRM LLC; Thomas S. Keaty

(57) ABSTRACT

A remote control and communication advertising display system and method for displaying advertising content and other related information to traffic outside a commercial space, providing a remote control and communication advertising display having two display units, each having a programmable display and a sensor housing, two wheeled base units having motorized wheel units, and an electronics unit having a rechargeable battery, a power and charge controller, a movement controller, a sensor controller, a communications controller with an RF antenna, and a display controller. The remote control and communication advertising display can move safely under its own power and control using real-time data from sensors, can communicate wirelessly for receiving changing advertising content and optionally for transmitting information gathered from sensors back to the commercial space, and can selectively display updated advertising content based on sensor information and on instructions received wirelessly.

20 Claims, 7 Drawing Sheets

(56) References Cited

U.S. PATENT DOCUMENTS

2018/0317330 A1* 11/2018 Dunn .................. G02F 1/13338
2022/0236940 A1*  7/2022 Adsett .................. G06F 1/1656
2024/0212531 A1*  6/2024 Smith ................. G09F 13/0448

FOREIGN PATENT DOCUMENTS

| KR | 20100004583 U | 5/2010 |
| KR | 101259525 B1 | 5/2013 |
| KR | 20200042120 A | 4/2020 |

\* cited by examiner

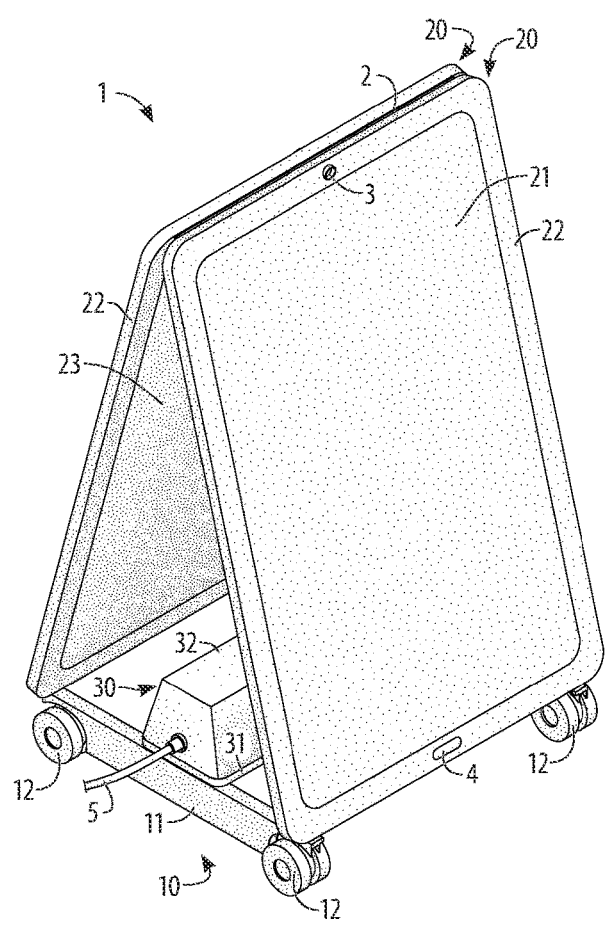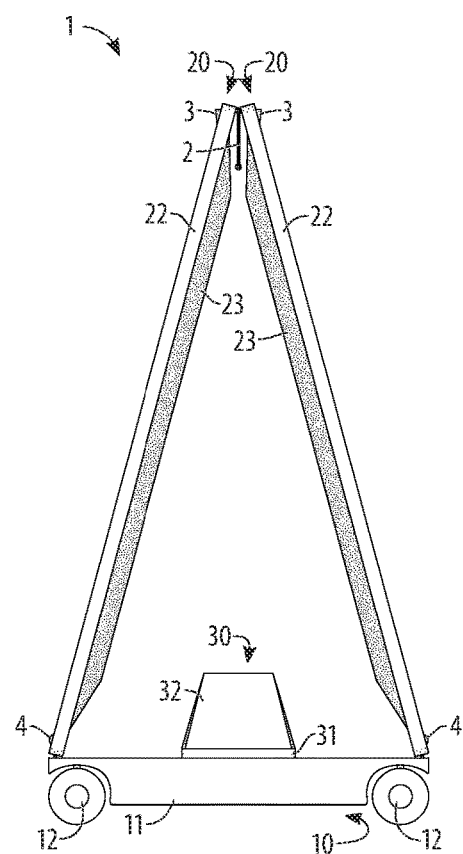
FIG. 2
FIG. 3

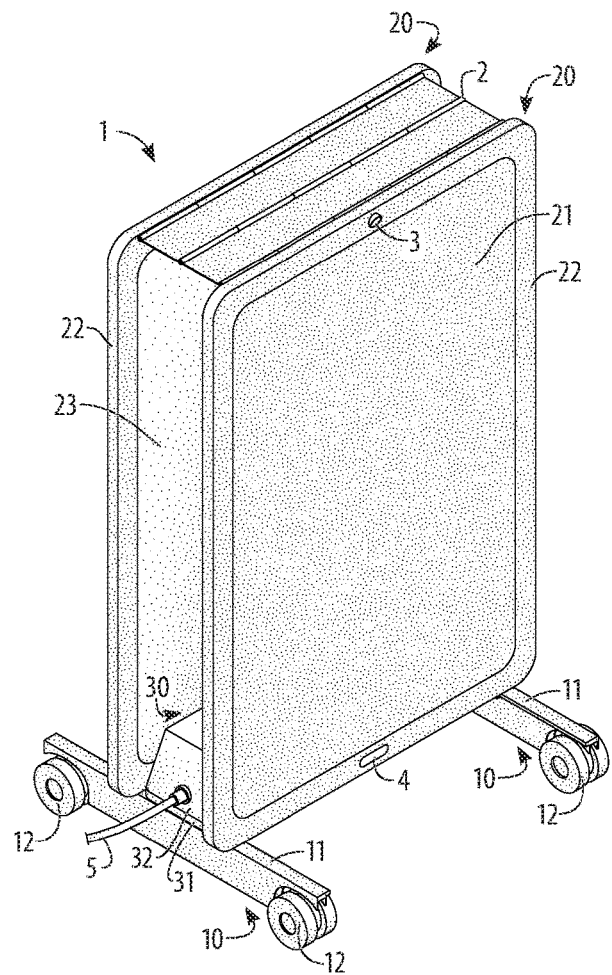
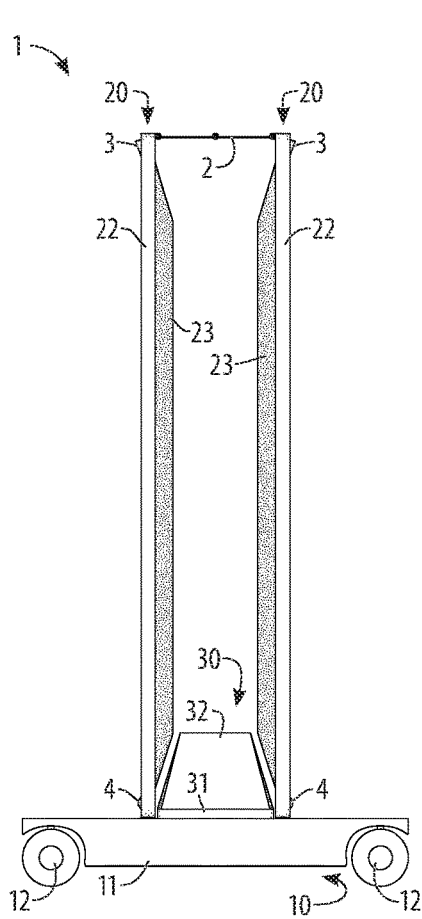
FIG. 4
FIG. 5

REMOTE CONTROL AND COMMUNICATION ADVERTISING DISPLAY SYSTEM AND METHOD

BACKGROUND OF THE INVENTION

This invention provides a remote control and communication advertising display system and method for displaying advertising content and other related information to traffic outside a commercial space.

Double-sided display boards, sometimes called "A-boards" to distinguish them from "sandwich boards" which in the stricter sense are worn by a person, are commonly placed outside and near to retail shops, pubs, bars, nightclubs, or restaurants, which are referred to as "commercial spaces" here. A-boards are particularly effective when used in areas having high traffic, especially pedestrian traffic, for businesses wanting to attract people to walk in instead of walking past. Often all or part of the two display surfaces of the A-board will be an erasable surface such as a chalkboard or dry-erase board to allow changing information such as special promotions, daily specials, or performing acts appearing at a venue to be displayed. An A-board placed on a main street, road, or walkway can be useful to a business located off of the main path, such as around a corner, down an alley, or up or down stairs, because the A-board can inform people of a reason to make a diversion and directions for making the diversion.

Some kind of clever saying or statement or other information not directly relating to the business might also be written on the A-board to catch the attention of passing traffic and increase the occurrence and duration of people engaging with the advertising display. The ability to post changeable, varied, or current content alongside a main and relatively constant advertising message can draw people to engage with the advertising display because of the novel content. During the course of a business day and in different weather conditions and other circumstances, the information and offers might change because the optimal content for an A-board should appeal to the immediate interests of the passers-by. For example, information about today's lunch special is only relevant through the end of lunchtime, after which passers-by are likely to overlook the entire A-board because it is displaying irrelevant information. After lunchtime it might be better to remove the lunch-special content and replace it with nothing than to leave it on display through the evening, but optimally new and relevant content should be displayed instead of just leaving the display space unused. Presently, however, changing the content on an A-board is a manual process and is very cumbersome to do during the business day while the A-board is deployed in a high-traffic area. It would be beneficial to be able to be able to update the advertising display content often, or even constantly, without having to touch, move, or withdraw the display to do so.

Presently, unless an A-board can be observed immediately outside a window, there is very little information available about the interactions of passers-by with the A-board, such as how many stop, slow down, glance over, or ignore the display, and there is no information, for instance, about whether a person just entering the commercial space had stopped, stood, and studied the A-board before entering, or had not even looked directly at it.

The optimal physical location and orientation of an A-board might change during the course of a business day because of changes in traffic patterns, changes in ambient lighting conditions, or changes in the weather. It would be beneficial to be able to change the location and orientation of an A-board as needed. Instead of requiring a person to monitor conditions and personally make such moves and adjustments, it would be beneficial for an A-board to be able to sense conditions and to move under its own power, safely, sensing and avoiding obstacles, with a high degree of autonomy.

U.S. Pat. No. 10,636,335 for a "Portable Display Device and System," issued on Apr. 28, 2020 to inventors Ildikó Kis-Benedek Pinero et al., provides for portable display systems, devices, and methods. A portable display device can be attached to a moving object such as a vehicle and can include one or more digital displays for displaying images. A portable display device can communicate with external devices and display images based on the geographic location of the portable display device. The portable display device may also have several moving components for moving the digital displays between an upright position and a retracted position.

UK Publication No. 2 387 472 for an "Electronic Sandwich Board," published on Oct. 15, 2003 by inventor Howard Christopher McNair, discloses an apparatus for advertising or like purposes comprising a "sandwich board" arrangement in which one or each board takes the form of a flat LCD graphics display panel controlled by processor means carried by the person wearing the sandwich board. The processor is arranged to cause the display to present a succession of graphics or text images, even moving images, derived from or stored in electronic memory associated with the processor and also forming part of the apparatus carried by the person using the apparatus.

US Publication No. 2016/0140886 for "Yellow Fellow Safety Signs," published on May 19, 2016 by inventor Eddie Melvin Green, Jr., discloses a wet floor safety sign. It has the ability to give aid in early warning to the seeing impaired and to caution the unexpected person of a potential hazard by sounding a loud beeping sound or speaking a pre-recorded message. This wet floor sign also has flashing LED lights to help aid the hearing impaired when navigating their way around schools, stores, airports, shopping malls, and hospitals.

U.S. Pat. No. 9,302,617 for a "Portable Sign," issued on Apr. 5, 2016 to assignee Sylo Systems, LLC, provides for a lightweight portable sign which can be used in one aspect to protect stalled or broken-down vehicles with passengers still on board, to prevent oncoming vehicles or traffic from colliding with the stalled vehicles. An infinite number of messages may be displayed by input to the display through the use of a keyboard, smart phone application, auditory input or a pre-set selection of messages chosen by the user. The sign is computerized with onboard memory, processor and optionally, has sound and audio capabilities. An emergency communications system and method are also included. The method includes providing software applications communications components of the sign of the invention which then transmits a signal to a communications center, which then can direct the communication to a hospital, police or roadside assistance entity. The portable sign can also be used by law enforcement or government officials to redirect traffic or provide warnings and messages, or by merchants and vendors to aid in information to potential customers and store visitors. The portable sign can also be provided as an accessory to new vehicles.

Korean Patent No. 10-1259525 for a "Revolving Standing Signboard Equipped with LED Module," issued on May 6, 2013, provides for a rotation standing advertising board is provided to rapidly change the contents of an advertising board without using a tool and to prevent a short circuit of an LED (Light Emitting Diode) module by rain.

Korean Utility Model No. 20-0352298 for a "Portable Type Luminous Sign Board," issued on Jun. 4, 2004, provides for a portable luminescent sign board.

Korean Publication No. 20-2010-0004583 for a "Sign Board for a Road," published on May 7, 2010, discloses a road display panel comprising first and second display panels hingedly connected to each other; a light emitting display unit disposed on a front surface of at least one of the first and second display panels, the light emitting display unit having a reflecting plate recessed into the display panel and at least one light bulb installed in the reflecting plate; a control unit controlling a light bulb of the light emitting display unit; and an internal power source for supplying power to the light bulb and the controller of the light emitting display unit.

Korean Publication No. 10-2020-0042120 for a "Folding Type Standing Signboard Using LED," published on Apr. 23, 2020, discloses a folding standing signboard using an LED, which can be used while the folding standing signboard is upright in an A-shape by using an upper hinge unit and can be folded when moved and stored so that a desired phrase, an image and an emoticon can be output through an LED panel and power can be secured through sunlight.

SUMMARY OF THE INVENTION

This invention provides a remote control and communication advertising display for displaying advertising content and other related information to traffic outside a commercial space.

The remote control and communication advertising display provides a remote control and communication advertising display having two display units, each having a programmable display and a sensor housing, two wheeled base units having motorized wheel units, and an electronics unit having a rechargeable battery, a power and charge controller, a movement controller, a sensor controller, a communications controller with an RF antenna, and a display controller.

BRIEF DESCRIPTION OF THE DRAWINGS

Reference will now be made to the drawings, wherein like parts are designated by like numerals, and wherein:

FIG. 2 is a perspective view of the remote control and communication advertising display of the invention in use in an A-frame configuration;

FIG. 3 is a side view of the remote control and communication advertising display of the invention in use in an A-frame configuration;

FIG. 4 is a perspective view of the remote control and communication advertising display of the invention in use in a T-frame configuration;

FIG. 5 is a side view of the remote control and communication advertising display of the invention in use in a T-frame configuration;

DETAILED DESCRIPTION OF THE INVENTION

Figure 1:
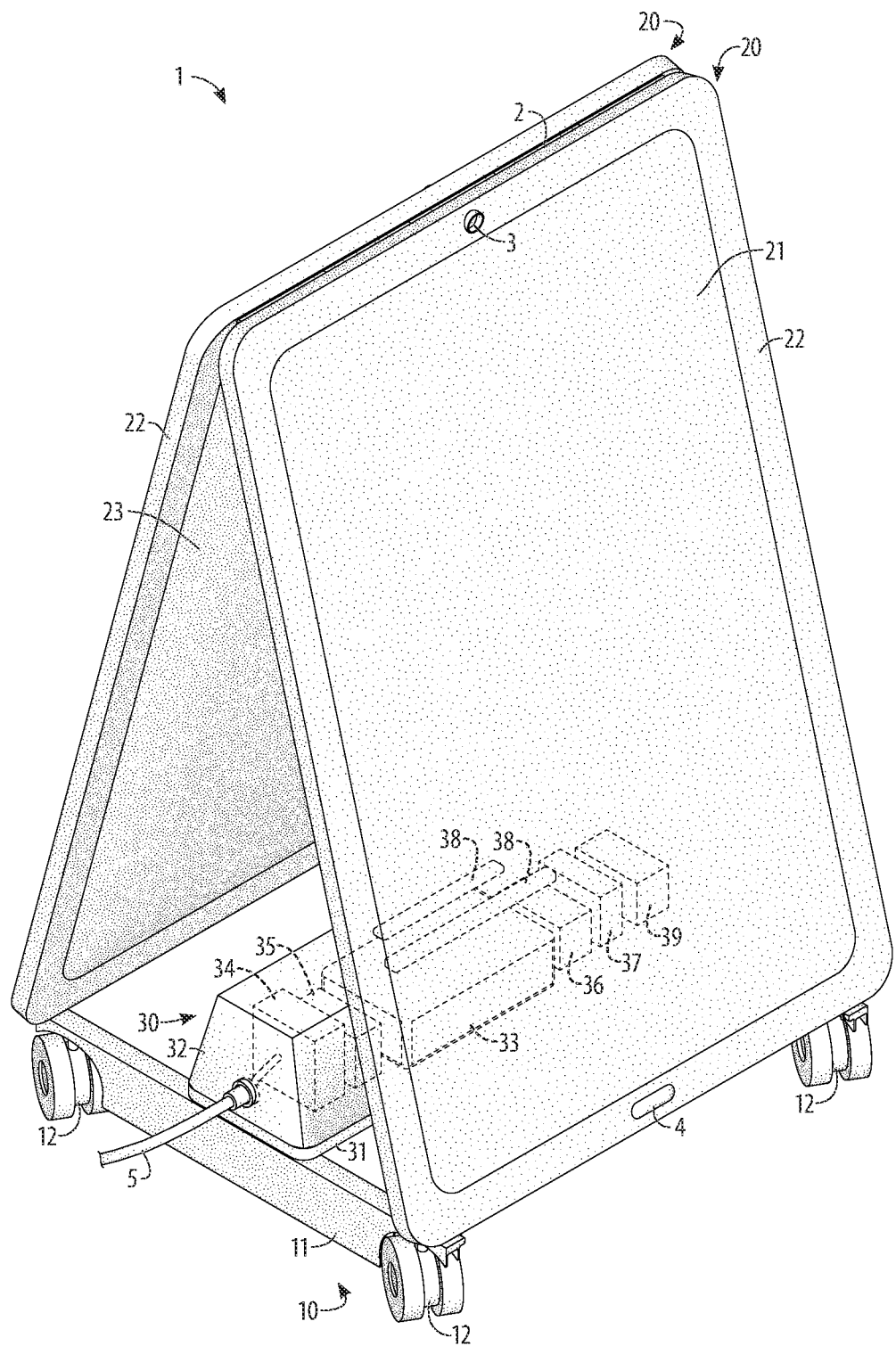
FIG. 1 is a perspective view of the remote control and communication advertising display of the invention.

Referring to FIG. 1, the remote control and communication advertising display 1 system is shown. The system displays advertising and other related information to traffic, such as foot traffic and vehicular traffic, outside a commercial space, such as a retail store or a dining or entertainment venue. The system might be placed, for example, on a sidewalk or near a street or road outside a freestanding commercial space, or on the walkway or in the hallway of a facility such as a shopping mall. The system might be placed on a main walkway to draw traffic to a commercial space around a corner or up or down stairs. The remote control and communication advertising display 1 can move around and can detect and avoid obstacles under set parameters. Optionally, the remote control and communication advertising display can transmit information gathered by its sensors, including an optional camera sensor, back to the commercial space in real time, to provide information such as number of people passing the display or stopping to engage with the display. The programmable displays 21 of the remote control and communication advertising display 1 system are high-quality graphics displays, such as LED television or monitor displays. The content shown on the programmable displays 21 can be varied, changed, updated, and customized in real time, with graphic content being supplied to the remote control and communication advertising display 1 via radio frequency (RF) signals such as cellular telephone, WIFI, BLUETOOTH, or other signals. Optionally, the content shown on the programmable displays 21 can be modified in real time based on real-time information gathered from the sensors in the sensor housing 4, and optionally from the camera 3.

It is anticipated that the remote control and communication advertising display 1 will frequently be used in close proximity to a particular commercial space and receive its instructions and content from that commercial space. The remote control and communication advertising display 1 can also be used more remotely from a particular commercial space because it can perform many operations autonomously according to set parameters and algorithms and because it can wirelessly transmit information and receive information such as updated advertising content and updated operating instructions. If one of the wireless communications means chosen for a particular application is, for instance, a cellular telephone network, then the remote control and communication advertising display 1 could be controlled from a very long distance. If the remote control and communication advertising display 1 were used by a large chain of retail shops, for example, the advertising display could be in communication with the local shop, the national or regional headquarters, or both. The remote control and communication advertising display 1 can also be used in temporary circumstances such as a fair or festival or convention where the commercial space is set up in a temporary booth or pavilion, and where it would be particularly useful to use advertising displays to inform people where, how, and why to seek out the commercial space.

The remote control and communication advertising display 1 provides two wheeled base units 10, each having a base member 11 and two motorized wheel units 12. Each motorized wheel unit 12 in turn provides an electric motor and one or more wheels such as the pair of wheels shown.

The remote control and communication advertising display 1 provides two display units 20 which are arranged such that the upper portions are mounted to each other at their upper portions through a top hinge 2, and the bottom portions are mounted to the wheeled base units 10, as shown. Each display unit 20 provides a programmable display 21 surrounded by a display frame 22 on a face portion of the display unit 20, and a display back 23 on a back portion. The two display units 20 are mounted such that their faces, having the programmable display 21, are facing outward and their back portions, having the display back 23, are facing inward towards each other. Optionally, solar panels can be incorporated into the display frame 22 to provide an additional source of power to recharge the rechargeable battery 33 through the power and charge controller 35.

The remote control and communication advertising display 1 provides an electronics unit 30 having an electronics support 31, which supports the electric and electronic components of the system, and an electronics cover 32, which covers and conceals the electric and electronic components and protects those components from tampering or damage. All or at least the top portion of the electronics cover 32 should be transparent to, and should not interfere with RF signals, because such RF signals are used during operation of the remote control and communication advertising display 1 for real-time communication between the remote control and communication advertising display 1 and the commercial space, as treated in more detail below.

The sensor housing 4 contains one or more sensors such as proximity sensors, movement sensors, ambient light sensors, and sound sensors. In a preferred embodiment, a sensor or sensors capable of detecting an object in close proximity to or in the intended path of movement of the advertising display is provided for the main purpose of avoiding obstacles. Such a sensor could be an infrared or ultrasound sensor or a LIDAR sensor. Such a sensor could also provide information about how many people or vehicles pass the advertising display, and how many stop or slow down, possibly to engage with the displayed material. An ambient light sensor can indicate how brightly the programmable display should be lit, and different ambient light levels on the two sides of the display can indicate two different brightness levels needed. The optional camera 3 is a sensor, which is not housed in the sensor housing 4, but is placed at the upper portion of the display frame 22 to capture a more useful visual perspective. The camera 3 can also be used for detecting and avoiding obstacles, but can also be used to obtain more detailed and more sophisticated information about people passing by the advertising display with or without looking at the display, and people slowing down or stopping to engage with the display. At a high level of detail and sophistication, the eye movements of people could be analyzed for more detailed information about how people are engaging with the display. Images of a person or people standing in front of the display can be transmitted in real time to the commercial space, allowing the early identification of who might or might not proceed to enter the commercial space. The information from the camera 3 could be used to make real-time modifications to the content displayed on one or both programmable displays 21.

Referring to FIG. 2 and FIG. 3, the remote control and communication advertising display 1 can be used in an "A-frame" configuration with the upper portions of the display units 20 held closer to each other by the top hinge 2, while the lower portions of the display units 20 are held more distant from each other, resulting in the programmable displays 21 being angled upward toward the eye level of people walking past the remote control and communication advertising display 1.

Referring to FIG. 4 and FIG. 5, the remote control and communication advertising display 1 can also be used in a "T-frame" configuration with both the upper and lower portions of the display units 20 held at the same distance from each other, resulting in the programmable displays 21 being oriented substantially vertically and parallel to each other. The top hinge 2 provides three hinges such that the two long edges provide separate hinged attachment to the upper portions of the two display units 20, and a third hinge along the middle of the top hinge 2 separates the top hinge 2 into two plates which can be folded together for an "A-frame" configuration or extended flat for a "T-frame" configuration, as shown. In the "T-frame" configuration the two display units 20 are held sufficiently far from each other to allow room for the electronics unit 30, which is mounted centered on the wheeled base units 10.

The display back 23 of the display unit 20 provides the extended space required by present display technologies for even reflection and diffusion of the light or backlight sources. The display back 23 is tapered down at the upper portion to accommodate bringing the upper portions close together for an "A-frame" configuration, as shown in FIG. 3. The display back 23 is tapered down at the lower portion in order to provide symmetry with the taper at the upper portion, and to avoid contacting and interfering with the electronics cover 32, which can be provided with a corresponding taper, as shown in FIG. 5.

Figure 6:
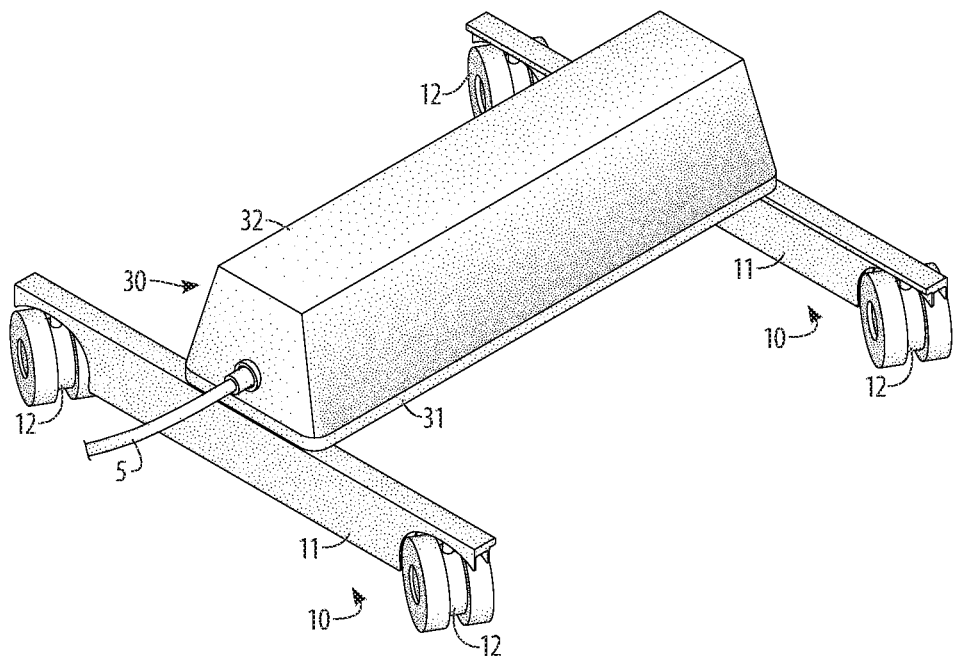
FIG. 6 is a detail perspective view of the electronics unit and wheeled base units of the remote control and communication advertising display of the invention.
Figure 7:
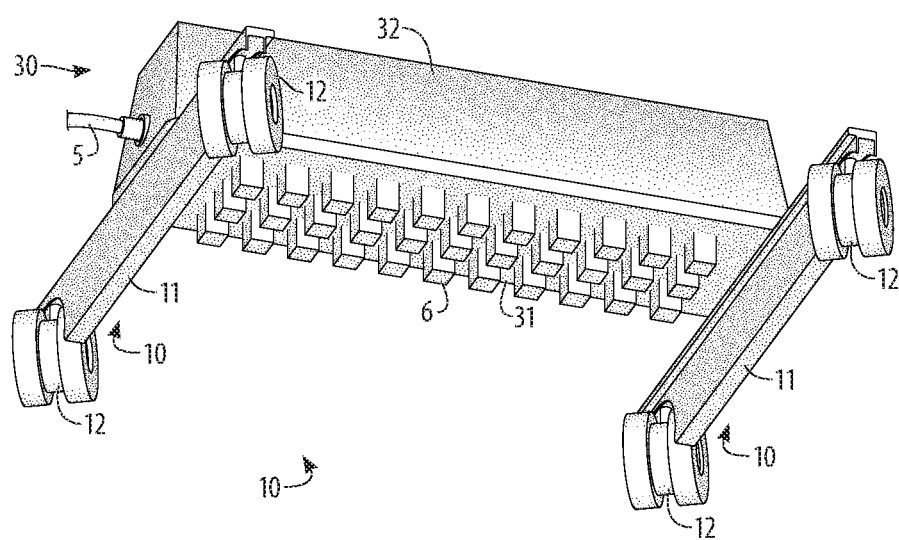
FIG. 7 is a detail underside perspective view of the electronics unit and wheeled base units of the remote control and communication advertising display of the invention.

Referring to FIG. 6 & FIG. 7, the electronics unit 30 is mounted across the middle portions of the two wheeled base units 10, as shown. The weight of the electronics unit 30 and the electric and electronics components, plus the weight of the base members 11 and motorized wheel units 12, results in most of the weight of the remote control and communication advertising display 1 located close to the ground, lowering the center of gravity and enhancing stability.

The electronics unit 30 provides an electronics support 31, which is a platform to support the electric and electronic components, as treated in detail below. The electronics support 31 should be strong enough for several electric and electronic components, including a transformer and a rechargeable battery. The electronics support 31 should act as a heat sink to move heat away from the electric and electronic components. Optionally, the electronics support 31 can be provided with supplemental heat sink 6 structures or configurations such as the protruding structures shown in FIG. 7, which increase the surface area available for transfer of heat, but are not as delicate and prone to damage as thin plates or fins. The electronics cover 32 conceals and protects the electric and electronic components and, as noted above, can be made to have a tapering profile to avoid contact with the tapered display back when the unit is used in the "T-frame" configuration. At least the top portion of the electronics cover 32 should be made of a material such as a plastic which does not block nor interfere with RF signals but is transparent to RF signals transmitted and received by the RF antenna 38.

A removable power supply line 5 is provided to provide electric power from external sources such as mains power, a generator, or an external battery to the electronics unit 30. The power from the external source can be used to recharge the rechargeable battery 33 of the remote control and communication advertising display 1, after which the removable power supply line 5 can be removed and the system can operate on battery power. The system can also be operated using power from external sources, through the removable power supply line 5.

Figure 8:
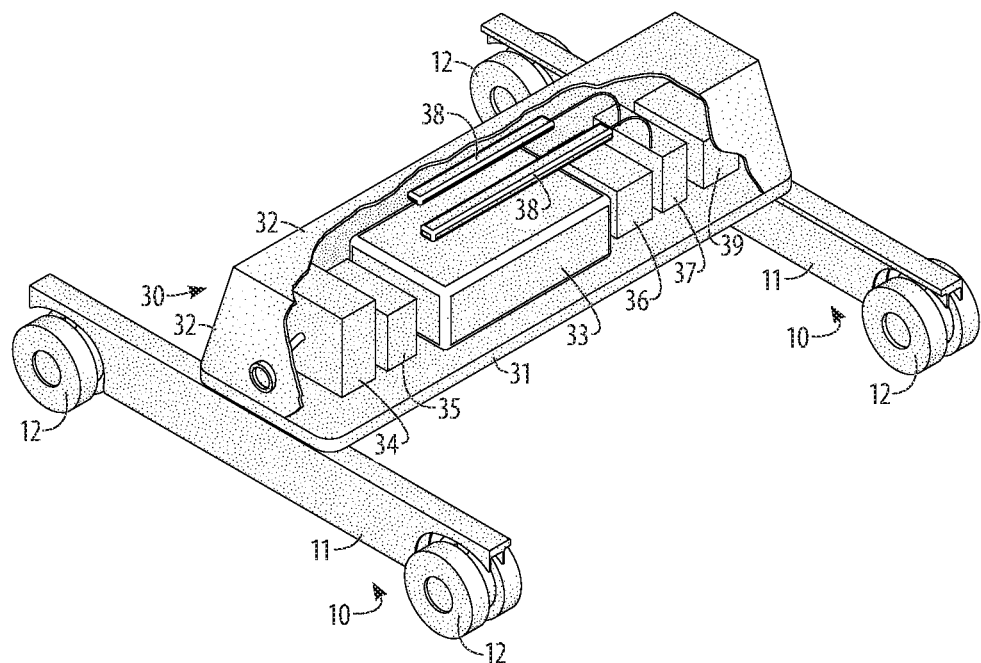
FIG. 8 is a cutaway detail view of the electronics unit and wheeled base units of the remote control and communication advertising display of the invention with wheels straight.
Figure 9:
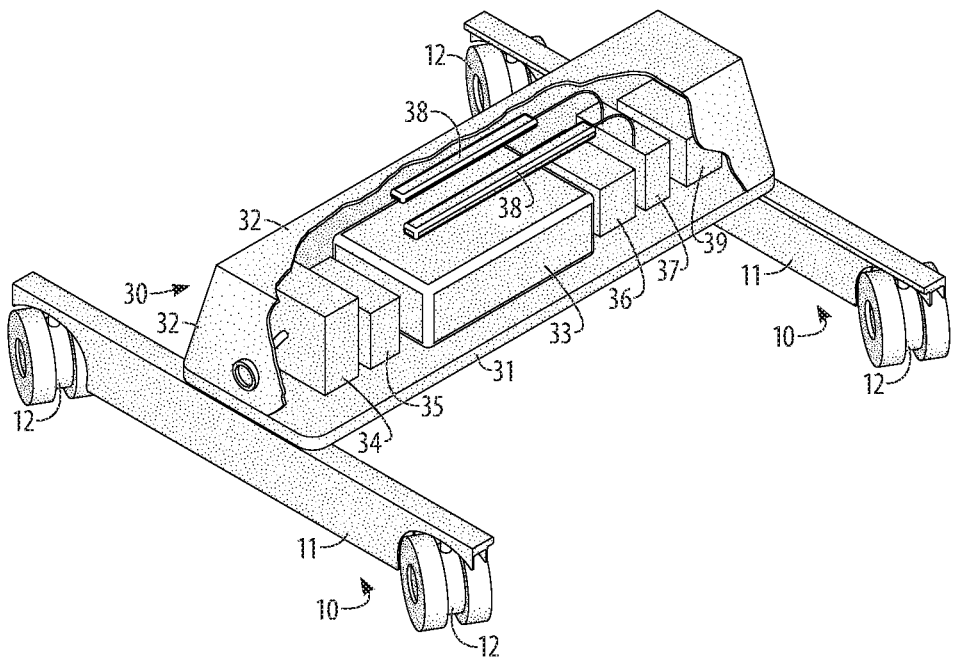
FIG. 9 is a cutaway detail view of the electronics unit and wheeled base units of the remote control and communication advertising display of the invention with wheels turned.
Figure 10:
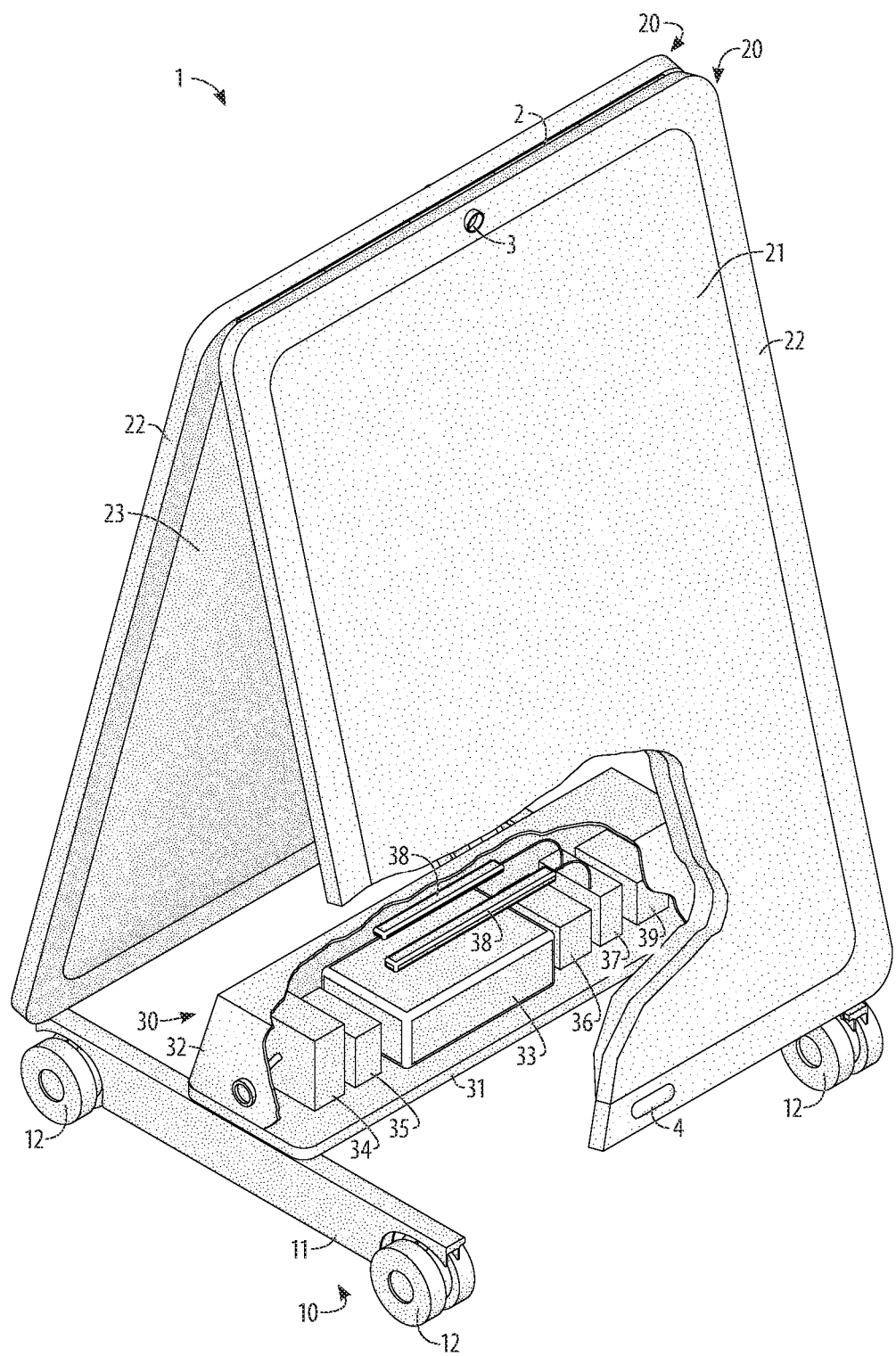
FIG. 10 is a cutaway perspective view of the remote control and communication advertising display of the invention with wheels straight.
Figure 11:
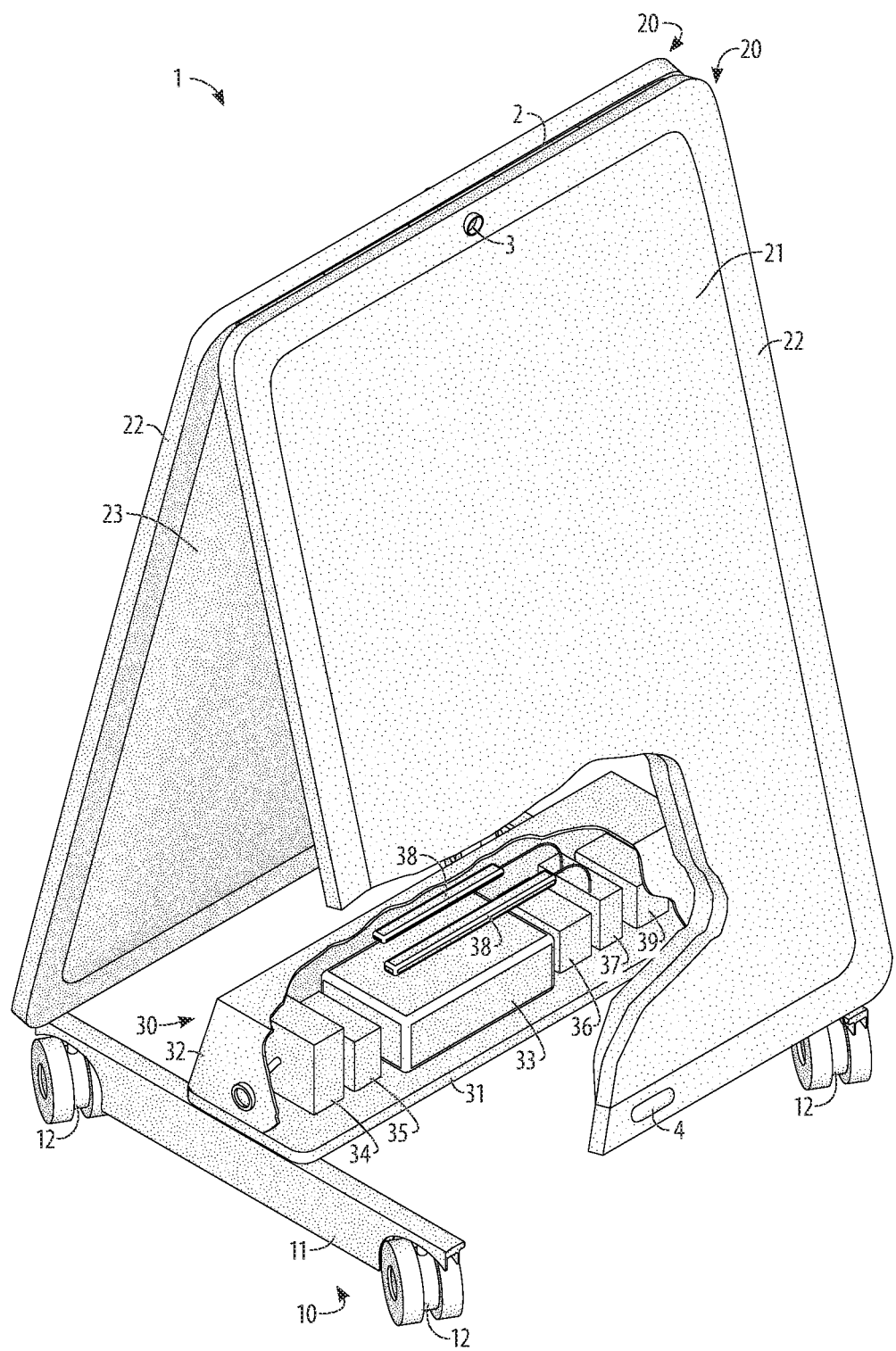
FIG. 11 is a cutaway perspective view of the remote control and communication advertising display of the invention with wheels turned.

Referring to FIG. 8 & FIG. 9, the motorized wheel units 12 can move the remote control and communication advertising display 1 forward and backward and in any direction by changing the angle of the wheels, as shown. The wheels operate under the control of a movement controller 35. Each motorized wheel unit 12 can be rotated about a horizontal axis to provide propulsive force, and can be rotated about a vertical axis to provide steering. These two different actions can be accomplished by using two different motors per wheel unit, in a preferred embodiment, or by directing the force of one motor through gearing. Rotation of each motorized wheel unit 12 about a vertical axis for steering is controlled by the movement controller 35, provided within the electronics unit 30, which directs the steering angle individually for each wheel unit, coordinating each wheel unit to contribute efficiently to the overall movement desired, and ensuring that the wheel units are not made to steer in incompatible, inefficient, or conflicting directions. The steering should be able to be locked in place, either as an inherent property of the motor used or by using a brake. Rotation of each motorized wheel unit 12 about a horizontal axis for propulsion is also controlled by the movement controller 35 in coordination with the propulsion and the steering of the other wheel units. The propulsive rotation should also be able to be locked in place, either as an inherent property of the motor used or by using a brake. In a preferred embodiment the wheels of each wheel unit should be able to be rotated in both a nominal forward and nominal reverse direction. In a different embodiment where only a nominal forward direction is provided, the steering control can be used to rotate the wheel unit substantially 180 degrees in order to achieve a reverse direction. In a preferred embodiment, stepper motors are used for both the steering and propulsion of each motorized wheel unit 12. Stepper motors have the inherent capability of being locked against unwanted rotation. Stepper motors also provide exact reliable directing and tracking of the rotational position of the motor, and therefore better control over steering and distance of movement. In this preferred embodiment the movement controller 35 issues precise steering and propulsion instructions to each motorized wheel unit 12, and receives precise data back from the motors. With such precise control the movement controller 35 can execute precise maneuvers such as small adjustments of position or turning in place, which might be needed in the course of a day to take advantage of or to avoid changing conditions. For example, the location and orientation of the advertising display might be adjusted to favor the prevailing traffic pattern at one time of day or as people are going to an event, and be changed to favor the different prevailing traffic pattern at another time or as people are leaving an event. For another example, the location and orientation of the advertising display might be changed to minimize glare from direct sunlight, surrounding lights, or headlights of vehicles. The movement controller 35 can receive data from the sensor controller 36, treated below, and can adjust the movement or the position of the advertising display based on analysis of the received data. For example, the sensor controller 36 might indicate the presence of an obstacle blocking the intended movement of the advertising display, and might indicate whether that obstacle is stationary or is itself moving. In response to this information, the movement controller 35 might stop, slow, or change the direction of movement of the advertising display.

The electronics unit 30 provides a rechargeable battery 33 for operation of the remote control and communication advertising display 1 on self-contained power. In a preferred embodiment, the rechargeable battery will provide 48 Volts and have a capacity of 17.5 ampere-hours or greater. The rechargeable battery should provide enough power to operate the two programmable displays at a brightness sufficient for ambient conditions and for a significant portion of a day and night. A rechargeable battery using lithium technology, such as a lithium-ion battery, is appropriate.

The electronics unit 30 provides a power and charge controller 34 which controls the use of electric power by the remote control and communication advertising display 1. When the advertising display is operating on external power supplied through the removable power supply line 5, the power and charge controller 34 provides any transformations and conditioning needed to provide the 48 DC volts used by the system. For example, mains AC power might be rectified to DC power and either transformed or converted to the needed voltage. Power from an external lower-voltage external battery might be boosted as needed, and power from a 48-volt external battery might be passed through with minimal conditioning. The power and charge controller 34 also manages the charging and discharging of the rechargeable battery 33, preventing overcharging or over-discharging, and balancing the charge on the several individual cells which are connected to make a 48-volt battery. Where optional solar panels are incorporated into the display frames 22 the power and charge controller 34 manages the utilization of power from the solar cells to recharge the rechargeable battery 33.

The electronics unit 30 provides a movement controller 35 which controls the operation of the motorized wheel units 12 by causing the wheels to steer in a direction, roll forward or backward at a particular speed, or lock in place, such that the independent operations of each motorized wheel unit 12 are coordinated to contribute to the overall movement of the advertising display. The movement controller 35 uses set algorithms plus data from the sensors passed through the sensor controller 36 plus instructions received via RF signals passed through the communications controller 37 for controlling the movement of the advertising display.

The electronics unit 30 provides a sensor controller 36 which controls the sensors housed within the sensor housing 4 plus the optional camera 3, if present. The sensor controller 36 receives data from the sensors, analyses the data, cross-references the data with data from other sensors as appropriate, and takes or initiates further action based on set algorithms. For example, when the stream of data from a sensor such as an infrared, ultrasound, or LIDAR sensor indicates that the moving advertising display is approaching an obstacle, the sensor controller 36 can instruct the movement controller 35 to stop moving, slow the moving, or move around the obstacle, as appropriate. The movement controller 35 would then control the individual motorized wheel units 12 as appropriate.

The electronics unit 30 provides a communications controller 37 which provides wireless communication between the remote control and communication advertising display 1 and the world outside the advertising display, most significantly with the commercial space associated with the advertising display, but not limited to only the one commercial space. The communications controller 37 sends and receives RF signals through at least one RF antenna 38. Because many different communications protocols use the same shared frequency bands, where the specific frequencies can vary by global region, one RF antenna 38 will frequently suffice. Additional RF antennae 38 can enable the use of additional frequency bands or could, for example, allow an advertising display to be used in a variety of global regions, such as for an internationally traveling exhibition, with the choice of RF antenna 38 being made via software parameters set through the communications controller 35. The electronics cover 32 or at least the upper portion of the electronics cover 32 is made transparent to the passage of RF signals in order to avoid interfering with operation of the RF antenna 38. Communications with the remote control and communication advertising display 1 through the communications controller 37 can be implemented through a connection to the Internet, in which case adequate encryption and security measures should be used.

The electronics unit 30 provides a display controller 39 which controls the operation of the two programmable displays 21. Default content such as the business name, logo, fonts, and preferred colors and graphics styles can be retained in non-volatile memory within the display controller 39. Changing content is received by the communications controller 37 through the RF antenna 38 and passed to the display controller 39 for display on one or both of the programmable displays 21. As treated above, changing content can be transmitted from the commercial space directly or from a different or more remote source. Information such as ambient light level from the sensors and optional camera 3 passed through the sensor controller 36 to the display controller 39 can be used to adjust the brightness of the programmable displays 21. Sensor information about a person apparently on a course to collide with the advertising display could cause the display controller 39 to flash the programmable display 21 as a warning. The display of certain changing content can be made conditional on certain conditions being detected and reported by the sensors and optional camera 3 through the sensor controller 36. For example, certain content could be displayed only under certain weather conditions or only when the detected volume of traffic was at a certain level.

In use, at the start of a business day, with the rechargeable battery 33 of the remote control and communication advertising display 1 inside the commercial space being recharged through the removable power supply line 5 and power and charge controller 34, the advertising display can move under its own power and control to a position outside the commercial space visible to a significant amount of pedestrian or vehicle traffic. Obstacles to such movement can be detected through the sensor controller 36 and the movement controller 35 can alter the steering and speed of the motorized wheel units 12 in order to avoid the obstacle. The advertising display can move to different locations or turn to face different directions during the course of the business day. Some or all of the displayed content can be changed and updated during the course of the business day, through the display controller 39, with some content being sent wirelessly through the communications controller 37, and with an ability to show some content selectively depending on information from sensors controlled by the sensor controller. The communications controller 37 can also wirelessly transmit information back to the commercial space. At the end of the business day the remote control and communication advertising display 1 can return to the commercial space for recharging.

Many other changes and modifications can be made in the system and method of the present invention without departing from the spirit thereof. We therefore pray that our rights to the present invention be limited only by the scope of the appended claims.

We claim:

1. A remote control and communication advertising display system for advertising directed toward traffic outside a commercial space, the remote control and communication advertising display system comprising:
   (i) two display units, each having an upper, lower, face, and back portion, each having a programmable display at the face portion, a display frame surrounding said programmable display, and a display back at the back portion;
   (ii) a sensor housing mounted on each said display frame adapted to contain at least one sensor;
   (iii) a top hinge connecting said display units at the upper portions such that said display backs are facing inward and said programmable displays are facing outward;
   (iv) two wheeled base units adapted to support said display units at the lower portions, each having a base member having two motorized wheel units;
   (v) an electronics unit mounted across said base members between said display units, having an electronics support adapted to support electronic components and having an electronics cover adapted to conceal and protect electronic components without interfering with RF signals;
   (vi) a removable power supply line adapted to provide electric current to electronic components within said electronics unit;
   (vii) a rechargeable battery within said electronics unit, adapted to store and provide power for operation of said remote control and communication advertising display system;
   (viii) a power and charge controller adapted to receive electric current through said removable power supply line, to transform electric current as needed for operation, and to regulate charging and discharging of said rechargeable battery;
   (ix) a movement controller within said electronics unit, adapted to control operation of said motorized wheel units for movement of said remote control and communication advertising display system;
   (x) a sensor controller within said electronics unit, adapted to capture data from said sensors and to analyze, store, and communicate such data;
   (xi) a communications controller within said electronics unit, adapted to provide RF communications with said remote control and communication advertising display system;
   (xii) at least one RF antenna connected to said communications controller; and
   (xiii) a display controller within said electronics unit, adapted to control operation of said programmable display.

2. The remote control and communication advertising display of claim 1, further comprising a camera placed in the upper portion of said display frame.

3. The remote control and communication advertising display of claim 1, where said rechargeable battery is a 48 DC volt battery.

4. The remote control and communication advertising display of claim 1, where said rechargeable battery is a lithium battery.

5. The remote control and communication advertising display of claim 1, where said rechargeable battery is a lithium-ion battery.

6. The remote control and communication advertising display of claim 1, where said rechargeable battery has a capacity of at least 17.5 ampere-hours.

7. The remote control and communication advertising display of claim 1, where said sensor housing contains a proximity sensor.

8. The remote control and communication advertising display of claim 1, where said sensor housing contains a movement sensor.

9. The remote control and communication advertising display of claim 1, where said sensor housing contains an ambient light sensor.

10. The remote control and communication advertising display of claim 1, where said sensor housing contains a sound sensor.

11. The remote control and communication advertising display of claim 1, where said display unit further comprises solar panels incorporated into said display frame.

12. The remote control and communication advertising display of claim 1, where said display units can be placed in an A-frame configuration.

13. The remote control and communication advertising display of claim 1, where said display units can be placed in a T-frame configuration.

14. The remote control and communication advertising display of claim 1, where said electronics support further comprises a heat sink.

15. The remote control and communication advertising display of claim 1, where said motorized wheel unit further comprises at least one stepper motor.

16. The remote control and communication advertising display of claim 1, where said motorized wheel unit further comprises two stepper motors.

17. The remote control and communication advertising display of claim 1, where said communications controller is further adapted to provide RF communications over a cellular telephone network.

18. The remote control and communication advertising display of claim 1, where said communications controller is further adapted to provide RF communications over a WIFI network.

19. The remote control and communication advertising display of claim 1, where said communications controller is further adapted to provide RF communications over a BLUETOOTH connection.

20. A remote control and communication advertising display method comprising:
(i) providing a remote control and communication advertising display, comprising:
   (a) two display units, each having an upper, lower, face, and back portion, each having a programmable display at the face portion, a display frame surrounding said programmable display, and a display back at the back portion;
   (b) a sensor housing mounted on each said display frame adapted to contain at least one sensor;
   (c) a top hinge connecting said display units at the upper portions such that said display backs are facing inward and said programmable displays are facing outward;
   (d) two wheeled base units adapted to support said display units at the lower portions, each having a base member having two motorized wheel units;
   (e) an electronics unit mounted across said base members between said display units, having an electronics support adapted to support electronic components and having an electronics cover adapted to conceal and protect electronic components without interfering with RF signals;
   (f) a removable power supply line adapted to provide electric current to electronic components within said electronics unit;
   (g) a rechargeable battery within said electronics unit, adapted to store and provide power for operation of said remote control and communication advertising display system;
   (h) a power and charge controller adapted to receive electric current through said removable power supply line, to transform electric current as needed for operation, and to regulate charging and discharging of said rechargeable battery;
   (i) a movement controller within said electronics unit, adapted to control operation of said motorized wheel units for movement of said remote control and communication advertising display system;
   (j) a sensor controller within said electronics unit, adapted to capture data from said sensors and to analyze, store, and communicate such data;
   (k) a communications controller within said electronics unit, adapted to provide RF communications with said remote control and communication advertising display system;
   (l) at least one RF antenna connected to said communications controller; and
   (m) a display controller within said electronics unit, adapted to control operation of said programmable display;
(ii) deploying said remote control and communication advertising display outside a commercial space;
(iii) transmitting updated advertising content to said remote control and communication advertising display wirelessly; and
(iv) recharging said remote control and communication advertising display.

* * * * *